US007940997B2

(12) United States Patent
Han et al.

(10) Patent No.: US 7,940,997 B2
(45) Date of Patent: *May 10, 2011

(54) METHOD AND APPARATUS FOR ENHANCING CONTRAST

(75) Inventors: Young-ran Han, Suwon-si (KR); Seong-deok Lee, Suwon-si (KR); Du-sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1134 days.

This patent is subject to a terminal disclaimer.

(21) Appl. No.: 11/584,666

(22) Filed: Oct. 23, 2006

(65) Prior Publication Data

US 2007/0104387 A1  May 10, 2007

(30) Foreign Application Priority Data

Nov. 10, 2005  (KR) .................. 10-2005-0107601

(51) Int. Cl.
*G06K 9/38* (2006.01)
*G06K 9/00* (2006.01)
*G06K 9/40* (2006.01)

(52) U.S. Cl. .................. 382/271; 382/168; 382/172

(58) Field of Classification Search .................. 382/162, 382/164, 165, 167, 168, 169, 172, 173, 254, 382/271, 274, 284; 348/225.1, 370–371, 348/630–631, 672; 358/515, 518, 520, 522, 358/523, 530

See application file for complete search history.

(56) References Cited

U.S. PATENT DOCUMENTS

| 6,018,588 | A  | * | 1/2000  | Kim ............... 382/167 |
| 6,049,626 | A  | * | 4/2000  | Kim ............... 382/167 |
| 6,078,686 | A  | * | 6/2000  | Kim ............... 382/167 |
| 6,507,372 | B1 | * | 1/2003  | Kim ............... 348/630 |
| 6,549,239 | B1 |   | 4/2003  | Tao |
| 6,650,774 | B1 |   | 11/2003 | Szeliski |
| 2003/0002736 | A1 | * | 1/2003 | Maruoka et al. ......... 382/168 |
| 2004/0008903 | A1 | * | 1/2004 | Kim ............... 382/274 |
| 2004/0208366 | A1 | * | 10/2004 | Kuwata .......... 382/171 |
| 2005/0031201 | A1 | * | 2/2005 | Goh ............... 382/169 |
| 2007/0104387 | A1 | * | 5/2007 | Han et al. ....... 382/271 |
| 2008/0037868 | A1 | * | 2/2008 | Han et al. ....... 382/169 |

FOREIGN PATENT DOCUMENTS

| KR | 10-0243301 A  | 11/1999 |
| KR | 10-0298412 B1 | 5/2001  |
| KR | 10-0319864 B1 | 12/2001 |
| KR | 10-0437807 B1 | 6/2004  |

* cited by examiner

*Primary Examiner* — Amir Alavi
(74) *Attorney, Agent, or Firm* — Sughrue Mion, PLLC

(57) ABSTRACT

A method of enhancing contrast includes obtaining a first luminance histogram of an input image; generating a second luminance histogram through pixel redistribution for the first luminance histogram; computing a conversion function based on both a first cumulative density function based on the first luminance histogram and a second cumulative density function based on the second luminance histogram; and changing the luminance distribution of the input image based on the conversion function.

14 Claims, 10 Drawing Sheets

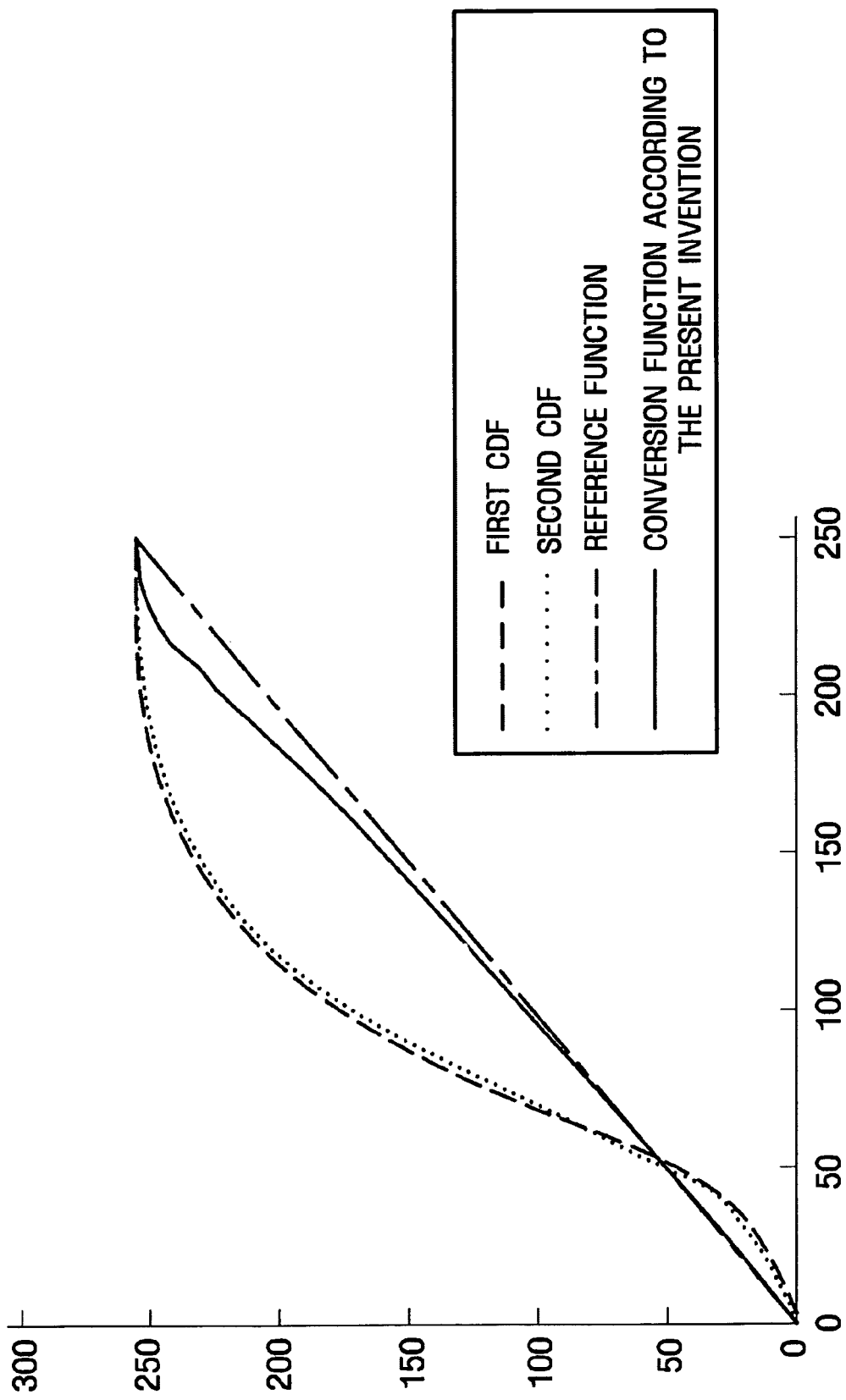

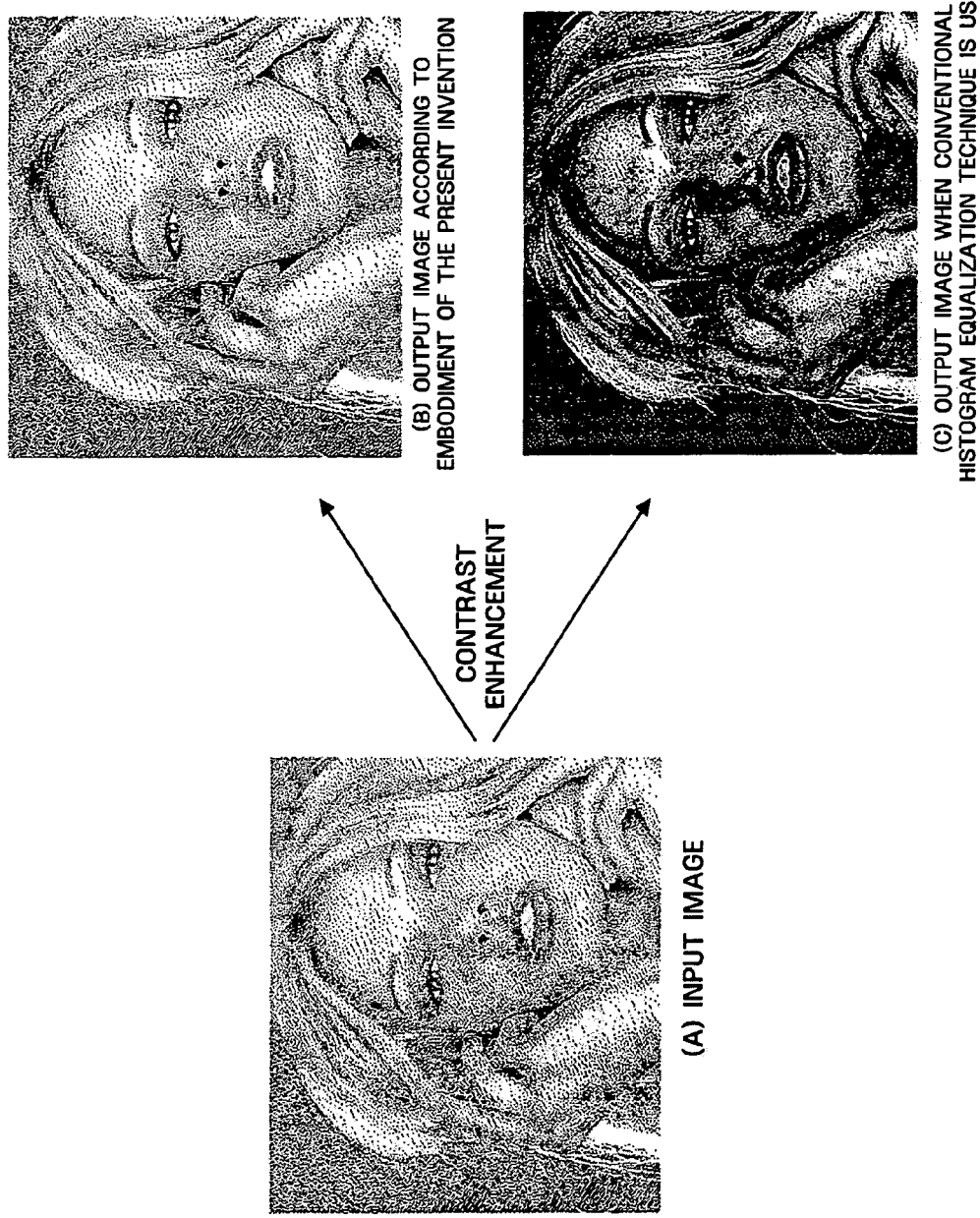

METHOD AND APPARATUS FOR ENHANCING CONTRAST

CROSS-REFERENCE TO RELATED PATENT APPLICATIONS

This application claims priority from Korean Patent Application No. 10-2005-0107601 filed on Nov. 10, 2005 in the Korean Intellectual Property Office, the disclosure of which is incorporated herein by reference in its entirety.

BACKGROUND OF THE INVENTION

1. Field of the Invention

Methods and Apparatuses consistent with the present invention relate to enhancing contrast, and more particularly to adaptively enhancing contrast for an input image, so that it is possible to prevent unnatural images, due to excessive enhancement of contrast, from being outputted.

2. Description of the Related Art

With the development of a digital electronics engineering technology, conventional analog data has been digitized. Accordingly, digital image signal processing technologies for digitizing and processing image signals have emerged. According to these digital image signal processing technologies, image information is compressed to increase the storage and transmission efficiency of the image information, and more vivid images are provided as compared with the input images, so that various levels of image processing can be accomplished. Among these technologies, a technology for enhancing the contrast of an image has also been actively researched.

According to the prior art for enhancing the contrast of an image, a luminance histogram equalization technique is known. The luminance histogram equalization technique is a method of enhancing the contrast of an input image by analyzing the luminance histogram of the input image and equalizing the distribution of the luminance histogram. Herein, the luminance histogram is the distribution of the luminance of pixels within the image. That is, the luminance histogram expresses the range and values of bright spots and dark spots existing in an image.

However, according to the conventional luminance histogram equalization technique as described above, since only an algorithm dependent on the luminance histogram of an input image is used, contrast may be excessively enhanced. Therefore, the output image may have unnaturally high contrast.

There exists a contrast enhancement method for computing the average and standard deviation of an input image, computing the average and standard deviation of a target image based on the computation results, and then generating a mapping function. However, since such a contrast enhancement method must modify a large quantity of parameters, a relatively high number of operations and amount of processing speed are required.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for adaptively enhancing the contrast of the luminance distribution of an input image.

In accordance with one aspect of the present invention, there is provided a method of enhancing contrast, including: obtaining a first luminance histogram of an input image; generating a second luminance histogram through pixel redistribution of the a first luminance histogram; computing a conversion function based on both a first cumulative density function based on the first luminance histogram and a second cumulative density function based on the second luminance histogram; and changing luminance distribution of the input image based on the conversion function.

In accordance with another aspect of the present invention, there is provided an apparatus for enhancing contrast, including: a luminance-computation module which extracts a first luminance histogram from an input image and computes a first cumulative density function based on the first luminance histogram; a luminance-distribution-modification module which generates a second luminance histogram through pixel redistribution of the first luminance histogram, and computes a second cumulative density function based on the second luminance histogram; a conversion function-providing module which computes a conversion function based on both the first cumulative density function and the second cumulative density function; and a conversion-processing module which changes luminance distribution of the input image based on the conversion function.

BRIEF DESCRIPTION OF THE DRAWINGS

The above and other aspects of the present invention will become apparent from the following detailed description of exemplary embodiments taken in conjunction with the accompanying drawings, in which:

FIGS. 8a and 8b are diagrams illustrating a conversion function according to an exemplary embodiment of the present invention; and FIG. 9 is a diagram illustrating enhancement results of contrast according to exemplary embodiments of the present invention, as compared with the related art.

DETAILED DESCRIPTION OF EXEMPLARY EMBODIMENTS OF THE INVENTION

Figure 1:
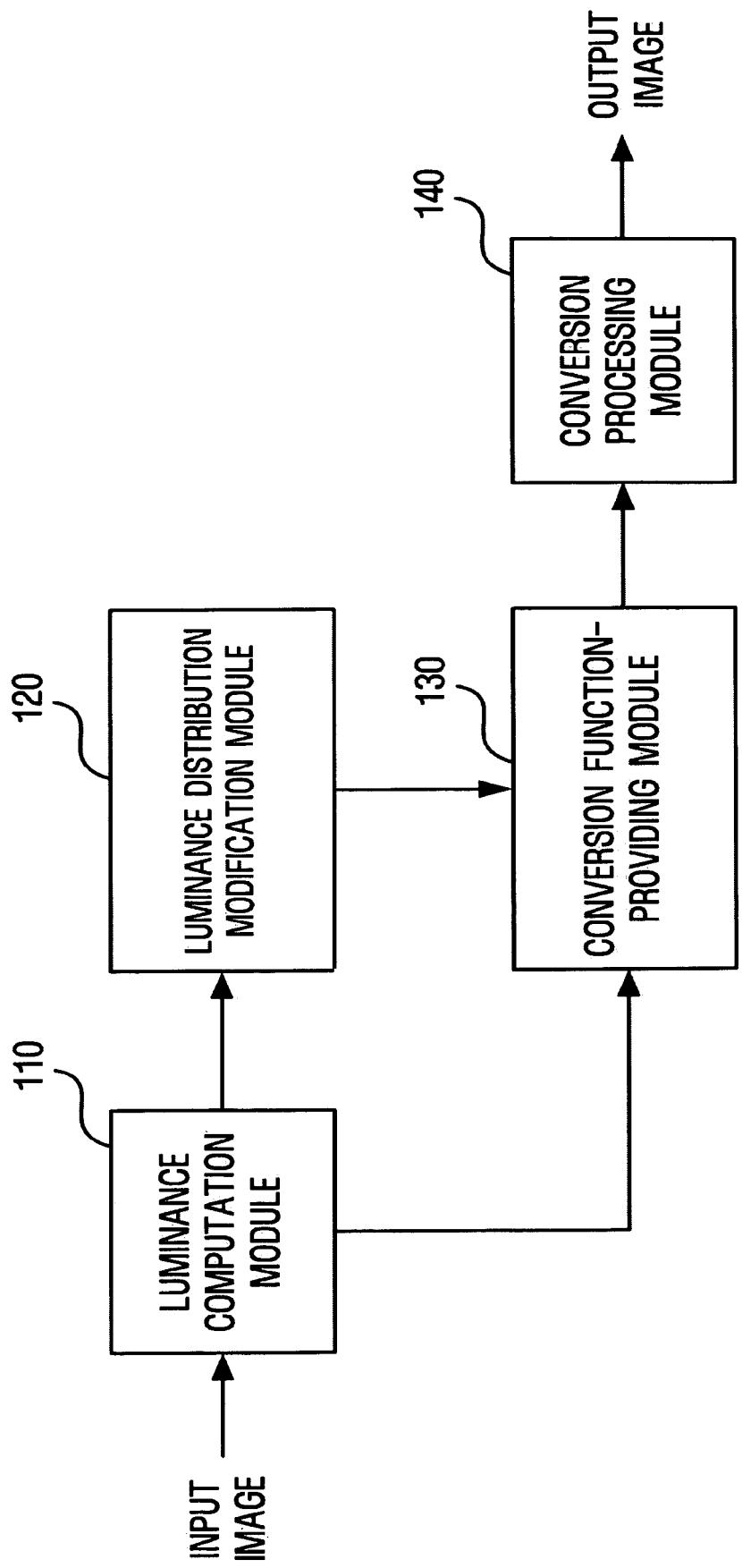
FIG. 1 is a concept diagram illustrating an apparatus for enhancing contrast according to an exemplary embodiment of the present invention.

Advantages and features of the present invention, and ways to achieve them will be apparent from exemplary embodiments of the present invention as will be described below together with the accompanying drawings. However, the scope of the present invention is not limited to such embodiments and the present invention may be realized in various forms. The exemplary embodiments to be described below are provided to properly disclose the present invention, and assist those skilled in the art to completely understand the present invention. The present invention is defined only by the scope of the appended claims. Also, the same reference numerals are used to designate the same elements throughout the specification.

FIG. 1 is a concept diagram illustrating an apparatus for enhancing contrast according to an exemplary embodiment of the present invention.

Referring to FIG. 1, the apparatus includes a luminance-computation module 110, a luminance-distribution-modification module 120, a conversion-function-providing module 130 and a conversion-processing module 140.

The luminance-computation module 110 extracts the luminance histogram of an input image, and computes a Cumulative Density Function (CDF) for the extracted luminance histogram. For example, the luminance-computation module 110 computes the frequency of pixels for the input image according to luminance levels, and generates a luminance histogram based on the computation results. Then, the luminance-computation module 110 can compute a Probability Density Function (PDF) based on the luminance histogram, and compute the CDF through an integration operation for the PDF. Equation 1 below shows one example of the CDF F(x) obtained by the method as described above.

$$F(x) = \sum_{i=0}^{x} n_i \qquad (1)$$

In Equation 1, $n_i$ represents the number of pixels having a luminance level of 1. For example, if the total number of pixels in one image is N, $$N = \sum_{i=0}^{L} n_i$$

is satisfied. Herein, L represents the maximum value of a luminance level, which may exist in an image frame.

The luminance-distribution-modification module 120 generates a new luminance histogram through pixel redistribution for the luminance histogram of the input image, and computes a new CDF based on the new luminance histogram. Hereinafter, for aiding the understanding of the present invention, the luminance histogram extracted from the input image by the luminance-computation module 110 will be referred to as a first luminance histogram, and the luminance histogram newly generated by the luminance-distribution-modification module 120 through the pixel redistribution for the first luminance histogram will be referred to as a second luminance histogram. Further, the CDF computed by the luminance-computation module 110 based on the first luminance histogram will be referred to as a first CDF, and the CDF computed by the luminance-distribution-modification module 120 based on the second luminance histogram will be referred to as a second CDF.

Figure 2:
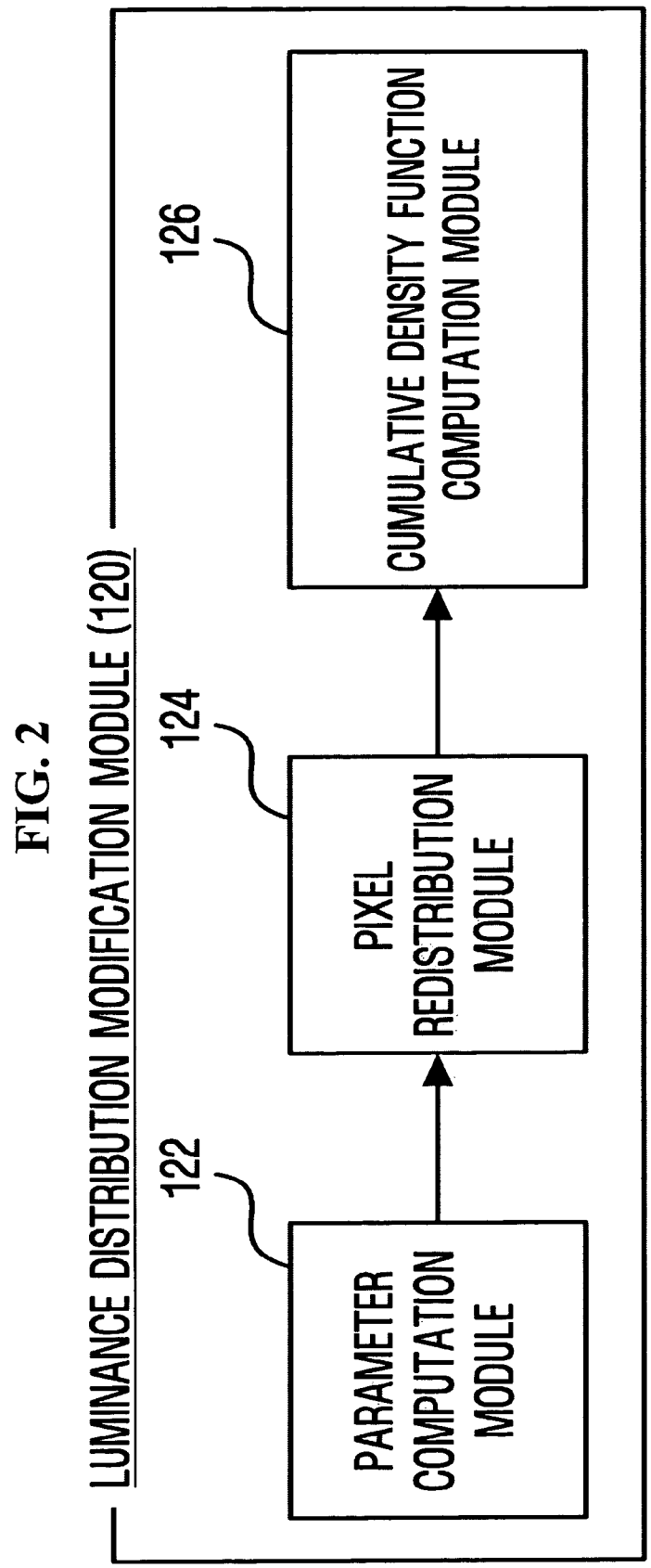
FIG. 2 is a detailed block diagram illustrating the luminance-distribution-modification module 120 of FIG. 1.

FIG. 2 is a detailed block diagram illustrating the luminance-distribution-modification module 120 for obtaining the second luminance histogram and the second CDF. Referring to FIG. 2, the luminance-distribution-modification module 120 includes a parameter computation module 122, a pixel redistribution module 124 and a CDF computation module 126.

The parameter computation module 122 provides a threshold value used for determining the redistribution amount of pixels. To this end, the parameter computation module 122 computes the rate of change of luminance of an input image when the first CDF is applied as a conversion function. Herein, the rate of change of luminance may be understood as the same concept as that of the ratio of change of a luminance histogram when the first CDF is applied as the conversion function. Hereinafter, a process for computing the rate of change of luminance according to one embodiment of the present invention will be described with reference to FIG. 3.

Figure 3:
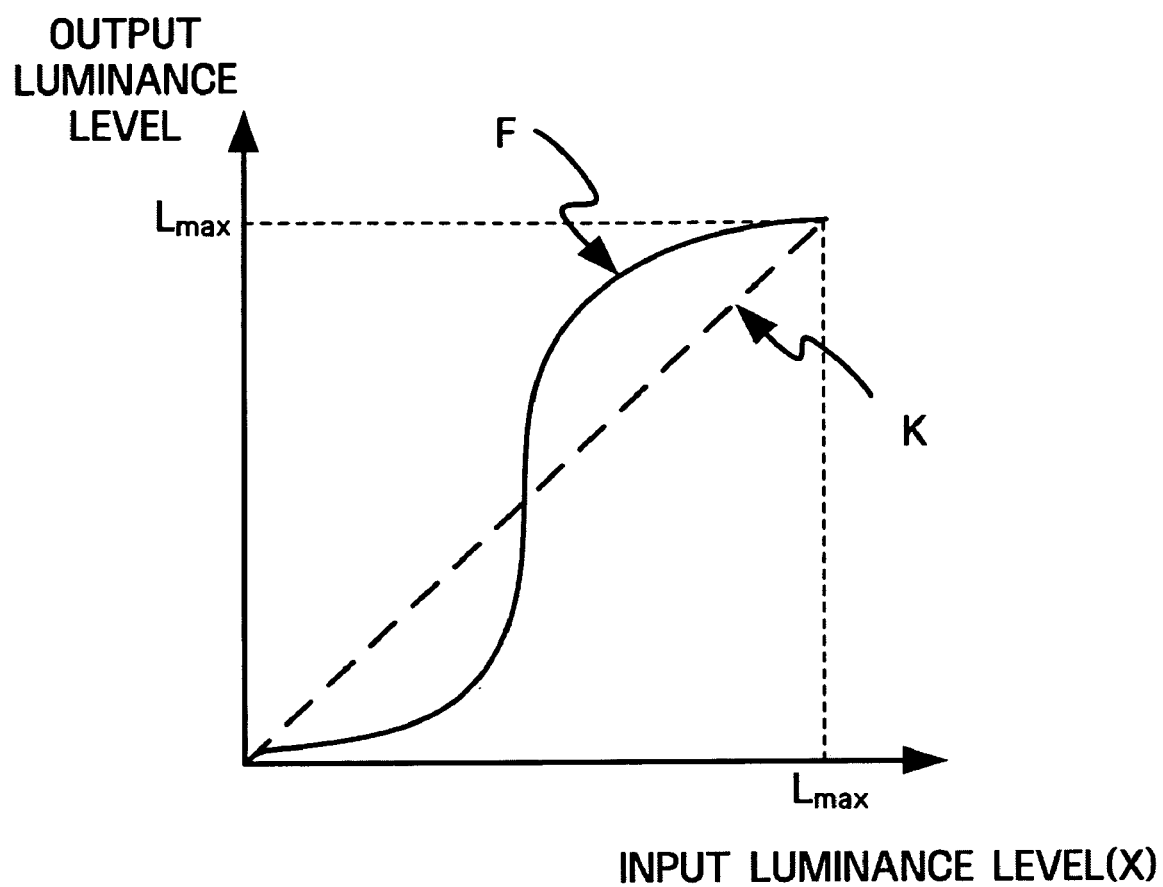
FIG. 3 is a diagram illustrating a cumulative density function according to an exemplary embodiment of the present invention.

In FIG. 3, a function K corresponds to a straight line having a slope of 45°. When the function K is used as a conversion function, an input value is equal to an output value. That is, when an input image is applied to the function K, there is no change of luminance in an output image with respect to an input image. Hereinafter, the function K having the same input and output will be referred to as a reference function. If the first CDF is a function F as illustrated in FIG. 3, the rate R of change of luminance may be obtained by Equation 2:

$$R = \frac{\int_0^{L_{max}} |K - F| dx}{L_{max} \times 1.0} \qquad (2)$$

In Equation 2, $L_{max}$ represents the maximum value of a luminance level, which may exist in an image. Generally, since a luminance level has a value of 0 to 255, $L_{max}$ may have a value of 255.

After computing the rate of change of luminance, the parameter computation module 122 computes a threshold value used for determining the redistribution amount of pixels for the first luminance histogram. The threshold value may have a smaller value as the rate of change of luminance increases, and may have a larger value as the rate of change of luminance decreases.

In one example of computing a threshold value, the parameter computation module 122 uses two threshold value determination functions using the rate of change of luminance as an input value. The parameter computation module 122 may compute the redistribution amount of pixels by means of a first threshold value determination function when the rate of change of luminance is greater than a first threshold ratio, and compute the redistribution amount of pixels by means of a second threshold value determination function when the rate of change of luminance is less than the first threshold ratio. The first threshold value determination function has a value less than that of the second threshold value determination function. That is, the first threshold value determination function and the second threshold value determination function have a correlation as illustrated in Equation 3:

First threshold value determination function<Second threshold value determination function    (3)

That is, when it is determined that the amount of change of the first CDF for a reference function is large, the parameter computation module 122 decreases the threshold value. However, when it is determined that the amount of change of the first CDF is small, the parameter computation module 122 increases the threshold value. Herein, the first threshold ratio and the threshold value determination function may be selected by an experiment so that an optimized threshold value can be obtained.

The first threshold value determination function and the second threshold value determination function according to one embodiment of the present invention are expressed by Equations 4 and 5:

$$\text{Threshold value}=4.0-R \text{ (if, } R \geq 0.09) \quad (4)$$

$$\text{Threshold value}=R \times 300 \text{ (if, } R<0.09) \quad (5)$$

In equations 4 and 5, R represents the rate of change of luminance described with reference to Equation 2, and the threshold ratio is 0.09. Further, in Equations 4 and 5, constants such as 0.09, 4.0 and 300 are values that may be obtained by experimentation in order to acquire optimized results. In a case in which Equations 4 and 5 are used, when the rate of change of luminance is greater than the threshold ratio of 0.09, the parameter computation module 122 computes the threshold value through Equation 4. However, when the rate of change of luminance is less than the threshold ratio of 0.09, the parameter computation module 122 computes the threshold value through Equation 5.

In the exemplary embodiment as described above, the parameter computation module 122 computes the threshold value by means of two threshold value determination functions. However, the present invention is not limited to only this case. That is, the parameter computation module 122 may compute the threshold value by means of one or multiple threshold value determination functions employing the rate of change of luminance as an input value. However, regardless of the number of threshold value determination functions used for computing the threshold value, according to the threshold value computation results by the parameter computation module 122, the threshold value decreases as the rate of change of luminance increases, and the threshold value increases as the rate of change of luminance decreases.

Referring to FIG. 2, the pixel redistribution module 124 redistributes pixels in the first luminance histogram by means of the threshold value computed by the parameter computation module 122, thereby generating the second luminance histogram. Herein, the pixel redistribution process may be understood as a kind of planarization work for the first luminance histogram. That is, in the pixel redistribution, the number of pixels with a luminance level having a high pixel density decreases, and the number of pixels with a luminance level having a low pixel density increases. Herein, the decreased number of pixels and the increased number of pixels are proportional to the threshold value.

Specifically, if the threshold value is computed by a unit corresponding to the number of pixels, the sum of the increased number of pixels is equal to the threshold value. This correlation may be expressed by Equation 6:

$$P_{count}=\text{threshold value,} \quad (6)$$

where $P_{count}$ represents the sum of the number of pixels to be increased.

In another exemplary embodiment, if the threshold value is computed by a ratio, the pixel redistribution module 124 increases the number of pixels until a ratio of the number of pixels to be increased with respect to the total number of pixels has a value equal to the threshold value. This may be expressed by Equation 7:

$$\frac{P_{count}}{P_{total}} \times 100 = \text{threshold value} \quad (7)$$

In Equation 7, $P_{count}$ represents the sum of the number of pixels to be increased, and $P_{total}$ represents the total number of pixels in the first luminance histogram. Equation 7 expresses a ratio by a percentage, but this is only an example. Accordingly, if the threshold value is computed by a ratio, the sum $P_{count}$ of the number of pixels, which the pixel redistribution module 124 increases for the total luminance level of the first luminance histogram, may be expressed by a product of the total number $P_{total}$ of pixels in the first luminance histogram and the threshold value.

Figure 4:
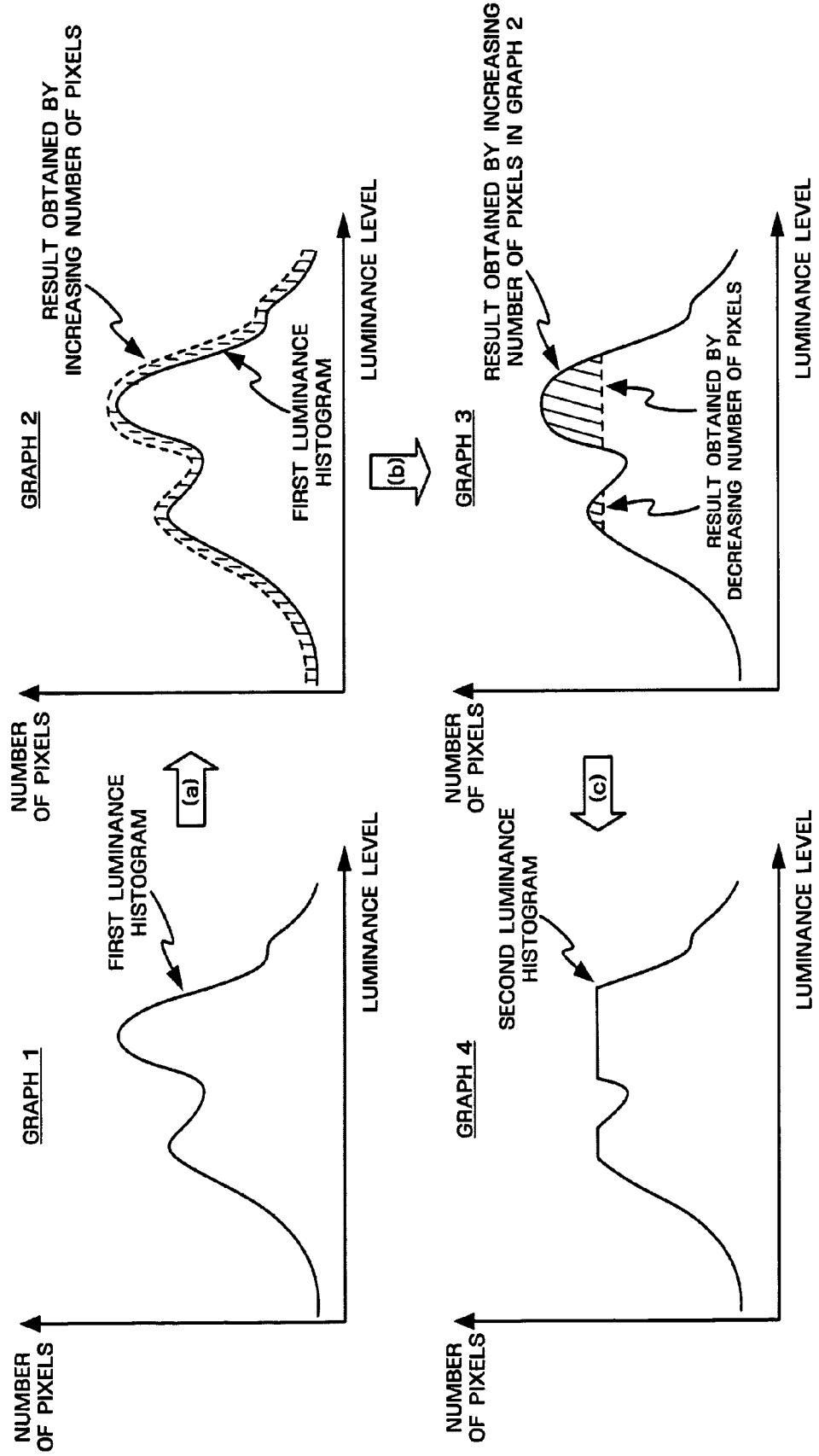
FIG. 4 illustrates a pixel redistribution process according to an exemplary embodiment of the present invention.

FIG. 4 illustrates the pixel redistribution process according to an exemplary embodiment of the present invention. In FIG. 4, a graph 1 represents the first luminance histogram. First, the pixel redistribution module 124 increases the number of pixels in each luminance level of the first luminance histogram (a). Herein, the number of pixels increasing according to the luminance levels is uniform, and the sum of the increased number of pixels is determined by the threshold value. Specifically, the increased number of pixels is set to be proportional to the threshold value.

A graph 2 shows a state in which the number of pixels is increased. In graph 2, a solid line represents the first luminance histogram, and a dotted line represents results obtained by increasing the number of pixels in each luminance level of the first luminance histogram. The increased number of pixels corresponds to an area (hatched area) between the solid line and the dotted line in graph 2.

Then, the pixel redistribution module 124 decreases the number of pixels in a sequence of a luminance level having a high pixel density in the first luminance histogram (the dotted line in graph 2) having the increased number of pixels (b). Herein, the sum of the decreased number of pixels has the same value as the previously increased number of pixels. That is, the decreased number of pixels may also be determined by the threshold value. Since the increased number of pixels (b) is equal to the decreased number of pixels, there is no change in the total number of pixels. A graph 3 shows a state in which the number of pixels is decreased. In graph 3, a solid line represents results (expressed by the dotted line in graph 2) obtained by increasing the number of pixels in the first luminance histogram, and a dotted line represents results obtained by decreasing the number of pixels in a sequence of the luminance level having the high pixel density from the state in which the number of pixels was increased. Herein, a portion below the dotted line is not separately illustrated because it overlaps with the solid line. Accordingly, an area (hatched area) between the solid line and the dotted line in graph 3 is proportional to the threshold value.

If the afore-described process is completed, final results are obtained for the pixel redistribution process for the first luminance histogram (c). The results are as illustrated in graph 4 of FIG. 4. The final luminance histogram acquired through the pixel redistribution process corresponds to the second luminance histogram. Such a pixel redistribution process is performed, so that the second CDF, which is to be generated, can be converged to a reference function. According to an exemplary embodiment of the present invention, when the number of pixels is reduced, the number of pixels, which has increased in graph 2 of FIG. 4, is maintained for an upper luminance level range, in which pixels of the second threshold ratio from among the total pixels of the first luminance histogram, having the increased number of pixels, are distributed starting with a high luminance level, so that it is possible to emphasize the white component of an image. Likewise, the number of pixels, which has increased in graph 2 of FIG. 4, is maintained for a lower luminance level range, in which pixels of the second threshold ratio from among the total pixels of the first luminance histogram, having the increased number of pixels, are distributed starting with the a low luminance level, so that it is possible to emphasize the black component of an image. Herein, the second threshold ratio may change according to a target value in which the white component and the black component are to be emphasized. Here, the second threshold ratio may be 5%. Such an embodiment will be described with reference to FIG. 5.

Figure 5:
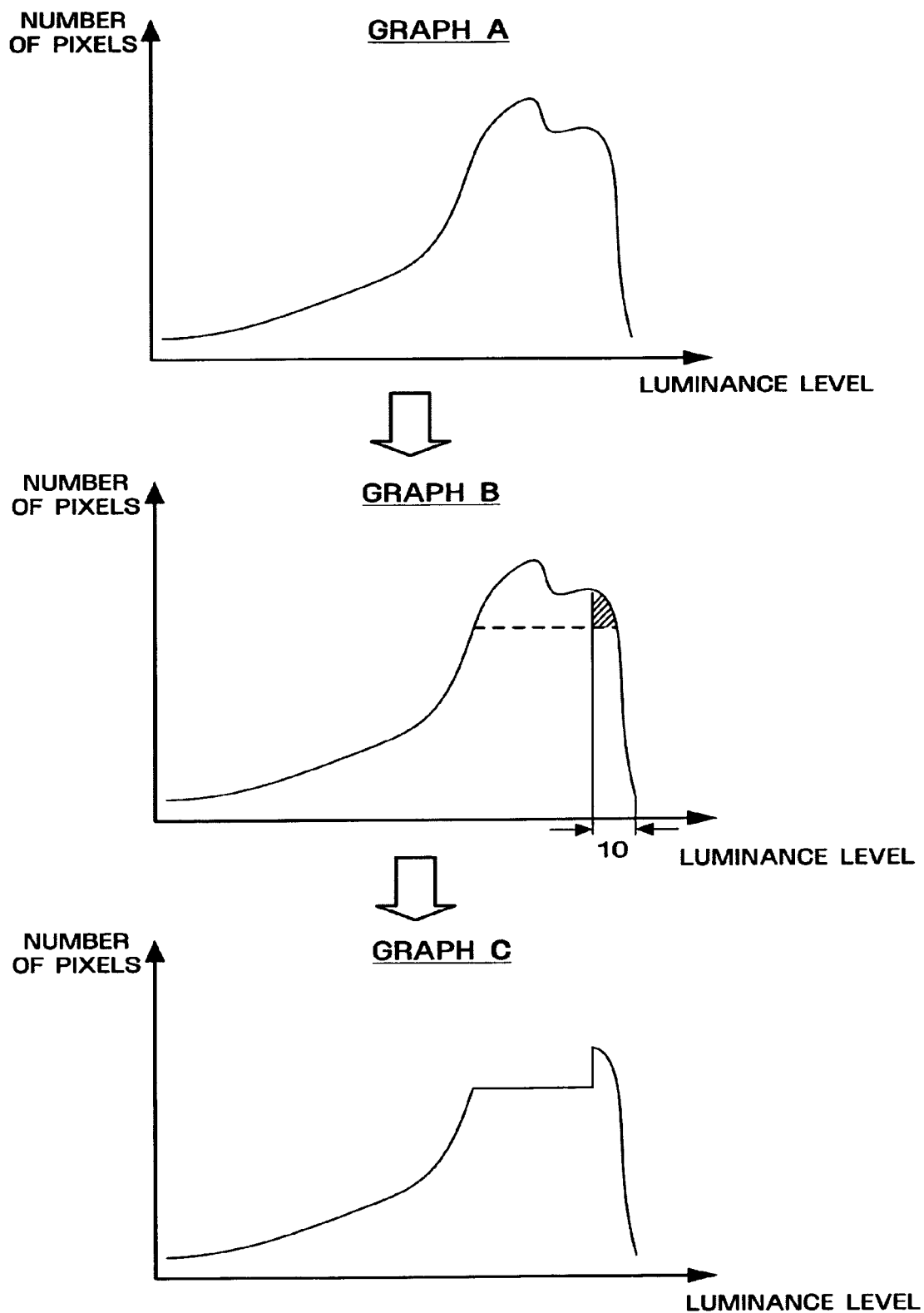
FIG. 5 illustrates a pixel redistribution process according to another exemplary embodiment of the present invention.

FIG. 5 illustrates a process in which, after the number of pixels for the entire luminance level of the first luminance histogram is increased (the process "a" in FIG. 4), the number of pixels is decreased, beginning with a high luminance level having a high pixel density, as in the process "b" in FIG. 4. As illustrated in a graph "b" of FIG. 5, if the upper luminance level range 10, in which pixels of the second threshold ratio from among the total pixels distributed in the graph "a" are distributed beginning with a high luminance level, is included in the luminance level, at which the number of pixels is to be reduced, the number of pixels is maintained for the upper luminance level range 10 without reduction, so that it is possible to emphasize the white component of an image. In FIG. 5, a portion, in which the number of pixels is not reduced, is hatched by slant lines. In such a case, the number of pixels at a different luminance level is reduced in a sequence of a high pixel density, instead of the upper luminance level range 10, and the results of a pixel redistribution process are as illustrated in a graph "c" of FIG. 5.

In the meantime, the CDF computation module 126 in FIG. 2 computes the second CDF based on the second luminance histogram. Since a process for computing the second CDF is similar to that for computing the first CDF, details will be omitted.

Referring to FIG. 1, the conversion function-providing module 130 computes a conversion function by means of the first CDF and the second CDF. Hereinafter, a process, in which the conversion function-providing module 130 computes the conversion function, according to an exemplary embodiment of the present invention will be described.

When an input image is A, if a new image obtained by means of the first CDF is B, A and B are correlated as illustrated in Equation 8:

$$B = F(A), \quad (8)$$

where the function F(A) represents the first CDF.

When an image having the second luminance histogram is C, if a new image obtained by means of the second CDF is V, C and V have correlation as illustrated in Equation 9:

$$V = G(C), \quad (9)$$

where the function G(C) represents the second CDF.

Finally, since an object is to obtain the image C having a new luminance distribution as compared with the input image, the image C can be obtained by means of the reversed function of the second CDF. This may be expressed by Equation 10:

$$C = G^{-1}(V), \quad (10)$$

where, if the image B obtained by applying the input image A to the first CDF is inputted instead of the virtual image V, Equation 11 is obtained:

$$C = G^{-1}(B) \quad (11)$$
$$= G^{-1}(F(A))$$
$$= H(A),$$

where the function H (A) represents a conversion function finally generated according to the embodiment of the present invention. The conversion function H is expressed in more detail by Equation 12:

$$H = G^{-1} \cdot F \quad (12)$$

That is, the conversion function, which the conversion function-providing module 130 has computed by means of the first CDF and the second CDF, corresponds to a synthesis function of both the reversed function of the second CDF and the first CDF.

Referring to FIG. 1, the conversion-processing module 140 changes luminance for the input image by means of the conversion function provided by the conversion function-providing module 130, and outputs the results. The output image outputted from the conversion-processing module 140 may be displayed to a user through a display unit (not shown).

The term "module", as used in the description of FIGS. 1 and 2, includes, but is not limited to, a hardware component, such as a Field Programmable Gate Array (FPGA) or an Application Specific Integrated Circuit (ASIC), which performs certain tasks. A module may advantageously be configured to reside on the addressable storage medium and configured to be executes on one or more processors. The functionality provided in the components and modules may be combined into fewer components and modules or further separated into additional components and modules.

Hereinafter, an operation process among the modules constituting the apparatus for enhancing contrast as described above will be described with reference to FIGS. 6 and 7.

Figure 6:
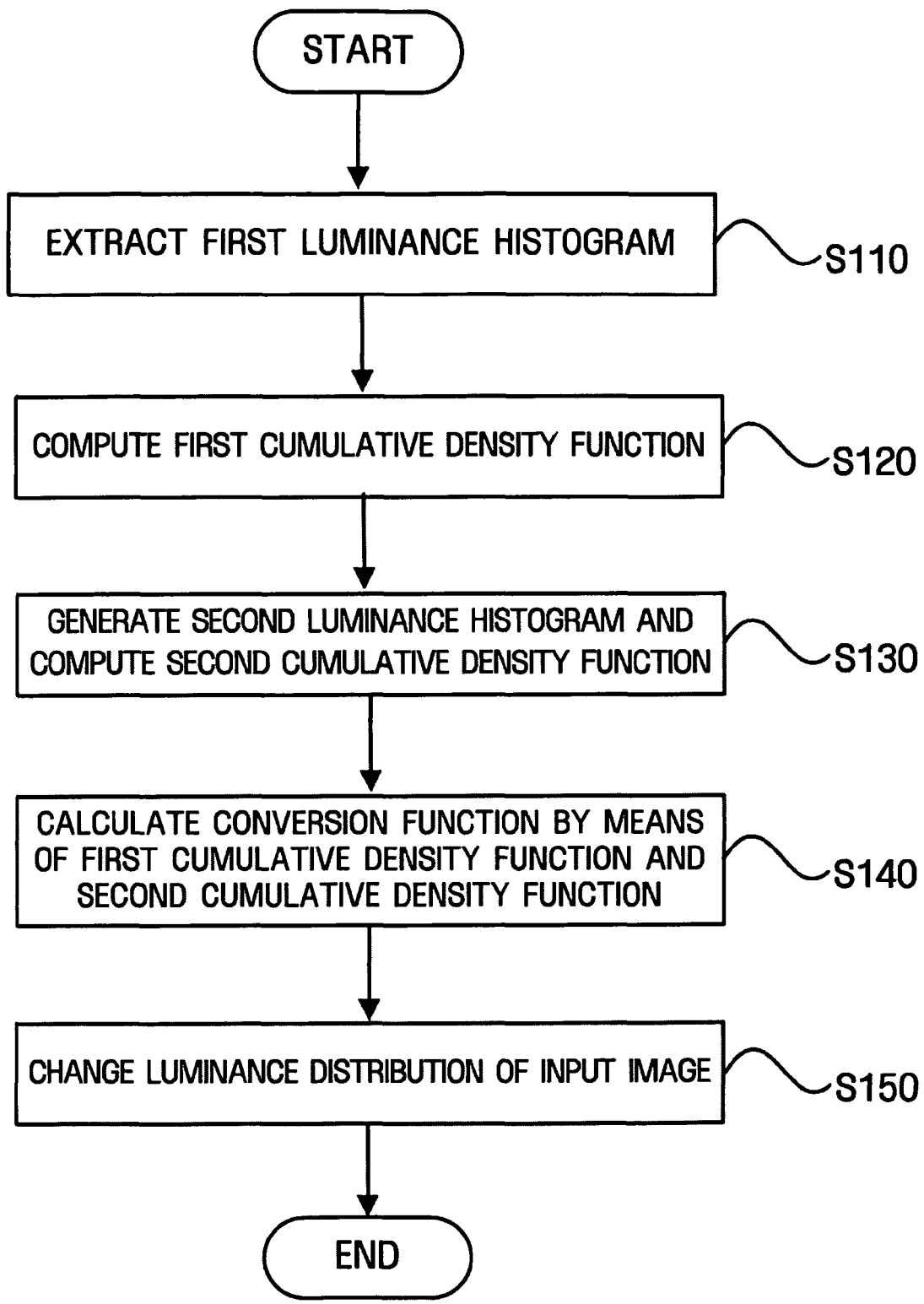
FIG. 6 is a flow diagram illustrating a method of enhancing contrast according to an exemplary embodiment of the present invention.

FIG. 6 is a flow diagram illustrating a method for enhancing contrast according to one embodiment of the present invention.

First, if an image is input, the luminance-computation module 110 extracts the first luminance histogram from the input image (S110), and computes the first CDF based on the first luminance histogram (S120).

Then, the luminance-distribution-modification module 120 generates the second luminance histogram through pixel redistribution for the first luminance histogram of the input image, and computes the second CDF based on the second luminance histogram (S130). The detailed embodiment for operation 130 will be described with reference to FIG. 7.

If the second CDF is computed, the conversion function-providing module 130 calculates the conversion function by means of both the first CDF computed by the luminance-computation module 110 and the second CDF computed by the luminance-distribution-modification module 120 (S140). Herein, the conversion function may be computed by a synthesis function of both the reversed function of the second CDF and the first CDF as described through Equations 8 to 12.

If the conversion function-providing module 130 calculates the conversion function, the conversion-processing module 140 changes luminance distribution of the input image by means of the conversion function (S150), and outputs an input image (i.e. corresponds to an output image), in which the luminance distribution has changed. The output image may be displayed through a display unit or stored in a storage medium.

Figure 7:
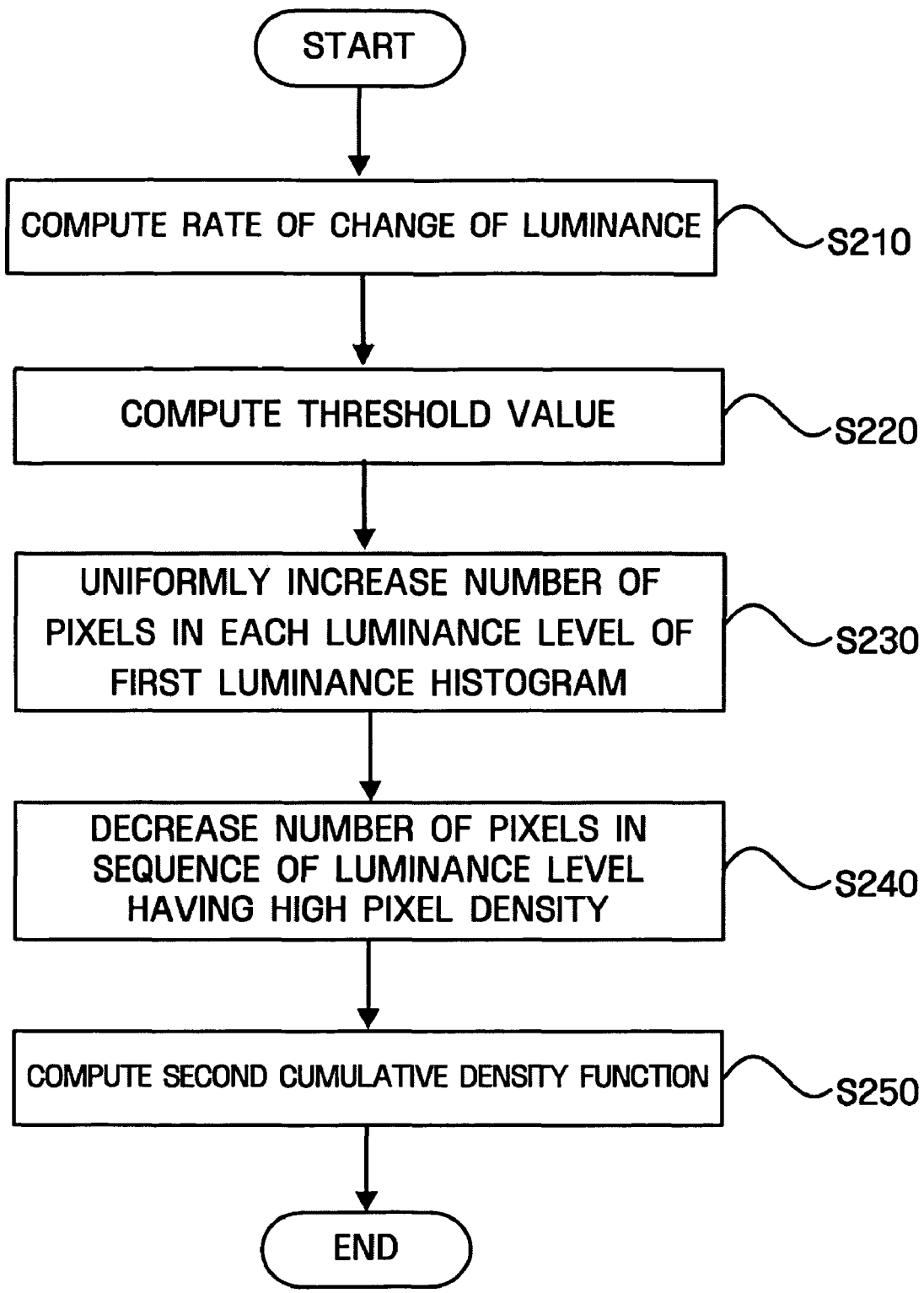
FIG. 7 is a flow diagram illustrating the computation process (S130) of the second cumulative density function of FIG. 6 according to an exemplary embodiment of the present invention.

FIG. 7 is a flow diagram illustrating the computation process (S130) of the second CDF of FIG. 6 according to an exemplary embodiment of the present invention.

First, the parameter computation module 122 computes the rate of change of luminance of the input image when the first CDF is applied as the conversion function (S210), and computes the threshold value based on the rate of change of luminance (S220). In order to compute the threshold value, the parameter computation module 122 may use a predetermined threshold value determination function employing the rate of change of luminance as an input value. The threshold value determination function corresponds to a function for outputting lower result values as the rate of change of luminance increases, and outputting higher result values as the rate of change of luminance decreases. When the rate of change of luminance is greater than the first threshold ratio, the parameter computation module 122 may compute the threshold value by means of the first threshold value determination function employing the rate of change of luminance as an input value. However, when the rate of change of luminance is less than the first threshold ratio, the parameter computation module 122 computes the threshold value by means of the second threshold value determination function employing the rate of change of luminance as an input value. Herein, the first threshold value determination function outputs lower result values, as compared with the second threshold value determination function. This is as described with reference to Equations 4 and 5.

If the threshold value is computed, the pixel redistribution module 124 uniformly increases the number of pixels in each luminance level of the first luminance histogram (S230). The total sum of the increased number of pixels is proportional to the threshold value computed by the parameter computation module 122.

Then, the pixel redistribution module 124 decreases the number of pixels in a sequence of a luminance level having a high pixel density in the first luminance histogram having the increased number of pixels (S240). Herein, the total sum of the decreased number of pixels is equal to that of the increased number of pixels in operation S230. The result after the number of pixels has decreased through operation S240 corresponds to the second luminance histogram.

According to an exemplary embodiment of the present invention, when the number of pixels is decreased in operation S240, the pixel redistribution module 124 may maintain the number of pixels without reduction, which has increased in operation S230, for an upper luminance level range, in which pixels of the second threshold ratio from among the total pixels of the first luminance histogram, having the increased number of pixels, are distributed in a sequence of a high luminance level. Likewise, the pixel redistribution module 124 may also maintain the number of pixels, which has increased in operation S230, for a lower luminance level range, in which pixels of the second threshold ratio from among the total pixels of the first luminance histogram, having the increased number of pixels, are distributed in a sequence of a low luminance level, so that it is possible to emphasize the black component of an image. Thus, it is possible to emphasize the black component of an image.

If the second luminance histogram is obtained, the CDF computation module 126 computes the second CDF based on the second luminance histogram (S250).

Figure 8B:
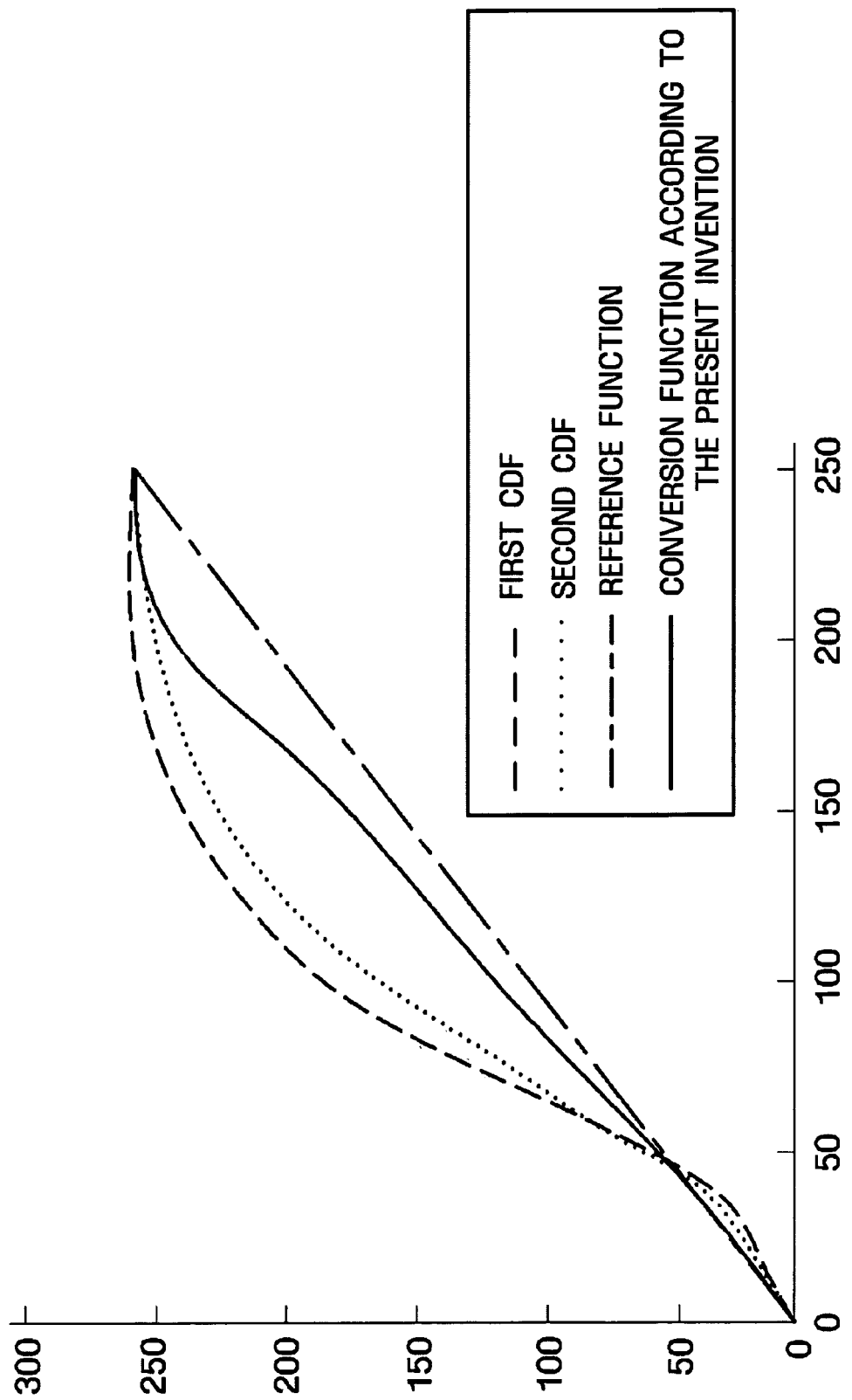

When the method for enhancing contrast as described above is used, one example of the finally generated conversion function is as illustrated in FIGS. 8a and 8b as graphs. As it can be understood in FIG. 8a, according to the present invention, as the first CDF approaches the second CDF, the conversion function approaches the reference function. As it can be understood in FIG. 8b, according to the present invention, as the first CDF is spaced from the second CDF, the conversion function approaches the first CDF. As illustrated in FIGS. 8a and 8b, the curve of the conversion function follows the curve of the first CDF, but it exists between the first CDF and the reference function through adjustment of the threshold value. Accordingly, it is possible to prevent contrast from being excessively enhanced, which may occur when the first CDF is used as the conversion function according to the related art.

FIG. 9 is a diagram illustrating the enhancement results of contrast according to the present invention, as compared with the related art. In FIG. 9, the image A is an input image, and the image C is an output image according to the prior art. The image B is obtained by using the first CDF as the conversion function based on the first luminance histogram. The image B is an output image obtained by using the conversion function according to the present invention. As it can be understood in FIG. 9, in the prior art, the contrast of the output image is excessively enhanced as compared with the input image. However, in the present invention, the output image is similar to the input image, but its contrast is enhanced as compared with the input image. Consequently, the present invention can output a more natural image, as compared with the related art.

A method and apparatus for enhancing contrast according to the exemplary embodiments described above may provide the following effects.

First, it is possible to realize simple hardware for the method.

Second, the characteristics of an image are adaptively applied to a conversion function, so that it is possible to omit a complicated computation process for definition of an image.

Third, since regional luminance distribution of an image is reflected to a conversion function, a dynamic range of a specific range is emphasized. Consequently, brightness and darkness can be shown more clearly among pixels at a luminance level having high density in an image.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of enhancing contrast, the method comprising:
using a processor to perform the steps of:
obtaining a first luminance histogram of an input image;
computing a first cumulative density function based on the first luminance histogram;
generating a second luminance histogram through pixel redistribution of the first luminance histogram;
computing a second cumulative density function based on the second luminance histogram;
computing a conversion function based on the first cumulative density function based on the first luminance histogram and the second cumulative density function based on the second luminance histogram; and
changing luminance distribution of the input image based on the conversion function.

2. The method of claim 1, wherein the generating the second luminance histogram comprises:
computing a rate of change of luminance based on the first cumulative density function, if the luminance distribution of the input image changes;
providing a threshold value based on the rate of change of luminance;

uniformly increasing a number of pixels in each luminance level of the first luminance histogram; and decreasing a number of pixels of at least one luminance level having the highest pixel density in the first luminance histogram in which the number of pixels has been uniformly increased;

wherein a total increased number of pixels is proportional to the threshold value, and a total decreased number of pixels is equal to the total increased number of pixels.

3. The method of claim 2, wherein the providing the threshold value comprises:

if the rate of change of luminance is greater than a first threshold ratio, computing the threshold value based on a first threshold value determination function employing the rate of change of luminance as an input variable; and if the rate of change of luminance is less than the first threshold ratio, computing the threshold value based on a second threshold value determination function employing the rate of change of luminance as an input variable, wherein the first threshold value determination function outputs result values less than result values of the second threshold value determination function.

4. The method of claim 2, wherein the providing the threshold value comprises computing the threshold value based on a threshold value determination function employing the rate of change of luminance as an input value, wherein the threshold value determination function outputs lower result values as the rate of change of luminance increases, and outputs higher result values as the rate of change of luminance decreases.

5. The method of claim 2, wherein the decreasing the number of pixels comprises decreasing the number of pixels of luminance levels, which exclude both of an upper luminance level range, in which pixels of a second threshold ratio from among total pixels of the first luminance histogram having the increased number of pixels are distributed in an order of luminance levels from high to low, and a lower luminance level range, in which pixels of the second threshold ratio from among total pixels of the first luminance histogram having the increased number of pixels are distributed in an order of luminance levels from low to high, from a total luminance level of the first luminance histogram having the increased number of pixels.

6. The method of claim 1, wherein the computing the conversion function comprises providing a synthesis function of both of a reversed function of the second cumulative density function and the first cumulative density function as the conversion function.

7. An apparatus for enhancing contrast, the apparatus comprising:

a processor which controls the operation of:

a luminance-computation module which extracts a first luminance histogram from an input image and computes a first cumulative density function based on the first luminance histogram;

a luminance-distribution-modification module which generates a second luminance histogram through pixel redistribution for the first luminance histogram, and computes a second cumulative density function based on the second luminance histogram;

a conversion function-providing module which computes a conversion function based on both of the first cumulative density function and the second cumulative density function; and a conversion-processing module which changes a luminance distribution of the input image based on the conversion function.

8. The apparatus of claim 7, wherein the luminance-distribution-modification module comprises:

a parameter computation module which computes a threshold value;

a pixel redistribution module which generates the second luminance histogram by redistributing pixels for the first luminance histogram based on the threshold value; and a cumulative density function computation module which computes the second cumulative density function based on the second luminance histogram.

9. The apparatus of claim 8, wherein the parameter computation module computes a rate of change of luminance if the luminance distribution of the input image changes by means of the first cumulative density function, and computes the threshold value based on the rate of change of luminance.

10. The apparatus of claim 9, wherein the parameter computation module computes the threshold value based on a first threshold value determination function employing the rate of change of luminance as an input variable if the rate of change of luminance is greater than a first threshold ratio, computes the threshold value based on a second threshold value determination function employing the rate of change of luminance as an input variable if the rate of change of luminance is less than the first threshold ratio; and wherein the first threshold value determination function outputs result values less than result values of the second threshold value determination function.

11. The apparatus of claim 9, wherein the parameter computation module computes the threshold value based on a threshold value determination function employing the rate of change of luminance as an input value, and the threshold value determination function outputs lower result values as the rate of change of luminance increases, and outputs higher result values as the rate of change of luminance decreases.

12. The apparatus of claim 8, wherein the pixel redistribution module uniformly increases a number of pixels in each luminance level of the first luminance histogram, decreases a number of pixels, in an order of luminance level from high to low, having a high pixel density in the first luminance histogram having the increased number of pixels, and a total increased number of pixels has a value proportional to the threshold value and a total decreased number of pixels has a value equal to the increased number of pixels.

13. The apparatus of claim 12, wherein the pixel redistribution module decreases the number of pixels for luminance levels, which exclude both of:

an upper luminance level range, in which pixels of a second threshold ratio from among total pixels of the first luminance histogram having the increased number of pixels are distributed, in an order of luminance level from high to low, and a lower luminance level range, in which pixels of the second threshold ratio from among total pixels of the first luminance histogram having the increased number of pixels are distributed, in an order of luminance level from low to high, from a total luminance level of the first luminance histogram having the increased number of pixels.

14. The apparatus of claim 7, wherein the conversion-function-providing module provides a synthesis function of both of a reversed function of the second cumulative density function and the first cumulative density function as the conversion function.

* * * * *